(12) United States Patent
Yashiro et al.

(10) Patent No.: US 11,236,663 B2
(45) Date of Patent: *Feb. 1, 2022

(54) EXHAUST SYSTEM FOR ENGINE

(71) Applicant: Mazda Motor Corporation, Hiroshima (JP)

(72) Inventors: Koichi Yashiro, Aki-gun (JP); Tamotsu Takamure, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,293

(22) Filed: Sep. 29, 2020

(65) Prior Publication Data

US 2021/0131340 A1    May 6, 2021

(30) Foreign Application Priority Data

Oct. 31, 2019    (JP) .............. JP2019-198404

(51) Int. Cl.
*F02B 37/02*    (2006.01)
*F01N 3/10*    (2006.01)
(Continued)

(52) U.S. Cl.
CPC .............. *F02B 37/02* (2013.01); *F01N 3/101* (2013.01); *F01N 3/2066* (2013.01); *F01N 11/00* (2013.01);
(Continued)

(58) Field of Classification Search
CPC ........ F02B 37/02; F02B 37/00; F01N 13/009; F01N 3/101; F01N 3/2066; F01N 11/00;
(Continued)

(56) References Cited

U.S. PATENT DOCUMENTS

| 2014/0060690 A1* | 3/2014 | Jang | F01N 3/103 138/155 |
| 2018/0030875 A1* | 2/2018 | Kamo | F01N 5/04 |

(Continued)

FOREIGN PATENT DOCUMENTS

| JP | 2018040368 A | 3/2018 |
| WO | 2013104543 A2 | 7/2013 |
| WO | WO-2015189011 A1 * | 12/2015 | ........... F01N 3/2066 |

OTHER PUBLICATIONS

Machine Translation of WO-2015189011-A1 (Year: 2015).*

*Primary Examiner* — Brandon D Lee
(74) *Attorney, Agent, or Firm* — Alleman Hall Creasman & Tuttle LLP (57) ABSTRACT

An exhaust system is provided to an engine having an output shaft extending in a vehicle front-and-rear direction. The system includes an exhaust passage including a first passage part extending forward from a turbine housing of a turbocharger, a fourth passage part extending in the front-and-rear direction below the turbine housing, a second passage part disposed so that it extends vertically and its center axis inclines forward and upward, and a third passage part having a downstream connecting part extending forward from a front end of the fourth passage part, and an upstream connecting part extending forward and upward from an upper part of a front end of the downstream connecting part. The downstream part has, at a lower part of its front end, an attaching part extending downwardly from a lower edge of the upstream part, and to which a sensor or an injector is attached.

15 Claims, 5 Drawing Sheets

(51) Int. Cl.
*F01N 3/20* (2006.01)
*F01N 11/00* (2006.01)
*F01N 13/00* (2010.01)
*F01N 3/021* (2006.01)
*F01N 13/10* (2010.01)

(52) U.S. Cl.
CPC ............ *F01N 13/009* (2014.06); *F01N 3/021* (2013.01); *F01N 13/10* (2013.01); *F01N 2340/04* (2013.01); *F01N 2340/06* (2013.01); *F01N 2560/00* (2013.01); *F01N 2610/1453* (2013.01)

(58) Field of Classification Search
CPC ............. F01N 2340/04; F01N 2560/00; F01N 2340/06; F01N 3/021; F01N 13/10; F01N 2610/1453; F01N 2610/02; F01N 13/18
See application file for complete search history.

(56) References Cited

U.S. PATENT DOCUMENTS

2018/0258822 A1* 9/2018 Kuramashi ......... F01N 13/0097
2019/0112970 A1* 4/2019 Goto ....................... F01N 13/14

* cited by examiner

EXHAUST SYSTEM FOR ENGINE

TECHNICAL FIELD

The present disclosure relates to an exhaust system for an engine, which is provided to the engine having an output shaft extending in a longitudinal direction of a vehicle, and has an exhaust passage provided with a turbine which is driven by exhaust gas of the engine.

BACKGROUND OF THE DISCLOSURE

Some conventional engines have an exhaust passage which is provided with a turbine driven by exhaust gas to boost intake air and an emission control device for purifying the exhaust gas. Further, a plurality of emission control devices may be disposed in the exhaust passage.

For example, JP2018-040368A discloses an engine system in which a turbine housing of a turbocharger, a monolith catalyst, and a monolith filter are provided in an exhaust passage, in this order from upstream to downstream. According to such an engine system, on the exhaust-side surface of the engine, the monolith catalyst is disposed forward of the turbine housing, and the monolith filter is disposed below the turbine housing. A connecting tube connecting the monolith catalyst and the monolith filter extends forward from the monolith catalyst, and the extended part is curved and then extends rearward to communicate with a front end part of the monolith filter. Thus, in the engine system of JP2018-040368A, since the turbine housing, the monolith catalyst, and part of the connecting tube are arranged in the axial direction of an output shaft of the engine, a longitudinal dimension of this area occupied by these components becomes large. Therefore, in such a structure, when the turbine is increased in size, a distance in the longitudinal direction between the exhaust passage and accessories, such as a radiator, disposed forward of the exhaust passage may be too short.

On the other hand, as disclosed in WO2013/104543A2, for example, by disposing an upstream emission control device so as to extend in a vertical direction, at a height between a turbine housing and a downstream emission control device, the longitudinal dimension of the area occupied by the turbine housing and the two emission control devices can be reduced.

However, even in a case where the upstream emission control device is disposed at the height between the turbine housing and the downstream emission control device so as to extend in the vertical direction as described above, if a sensor for detecting properties of exhaust gas is attached around the upstream emission control device, the distance in the longitudinal direction between the sensor and accessories disposed forward thereof may not be sufficiently secured, because the sensor protrudes forward from the exhaust passage.

SUMMARY OF THE DISCLOSURE

The present disclosure is made in view of the above situations, and one purpose thereof is to provide an exhaust system for an engine, which reduces a longitudinal dimension of a passage around a turbine housing and secures a sufficient distance between a sensor and an accessory disposed forward of the sensor.

According to one aspect of the present disclosure, an exhaust system is provided to an engine having an output shaft extending in a front-and-rear direction of a vehicle. The exhaust system includes an exhaust passage through which exhaust gas discharged from the engine circulates, a turbocharger having a turbine housing, the turbine housing being formed therein with a passage through which exhaust gas passes and configured to accommodate a turbine wheel being driven by exhaust gas, and a first purifying part and a second purifying part configured to purify exhaust gas. The exhaust passage includes a first passage part connected to a downstream end of the turbine housing, a second passage part having the first purifying part therein and connected to a downstream end of the first passage part, a third passage part connected to a downstream end of the second passage part, and a fourth passage part having the second purifying part therein and connected to a downstream end of the third passage part. The first passage part extends forward from the turbine housing. The fourth passage part extends in the front-and-rear direction below the turbine housing. The second passage part is disposed at a location between the first passage part and the third passage part in an up-and-down direction so that the second passage part extends in the up-and-down direction and a center axis thereof inclines forward and upward. The third passage part has a downstream connecting part extending forward from a front end part of the fourth passage part, and an upstream connecting part extending forward and upward from an upper part of a front end part of the downstream connecting part. The downstream connecting part has an attaching part provided to a lower part of the front end part thereof and extending downwardly from a lower edge of the upstream connecting part. One of a sensor configured to detect a property of exhaust gas and an injector configured to inject fluid into exhaust gas is attached to the attaching part.

According to this configuration, the fourth passage part having the second purifying part therein is disposed below the turbine housing, and the second passage part having the first purifying part therein is disposed so as to extend in the up-and-down direction from the first passage part extending forward from the turbine housing to the third passage part. Therefore, a dimension of an area in the front-and-rear direction occupied by the turbine housing and the purifying parts can be reduced compared with a case where the turbine housing and the purifying parts are lined up in the front-and-rear direction.

Moreover, according to this configuration, the second passage part and the upstream connecting part connected to the second passage part incline forward and upward, the attaching part which extends downwardly from the lower edge of the upstream connecting part is provided, and one of the sensor and the injector is attached to the attaching part. That is, a space for attaching one of the sensor and the injector is formed below the second passage part and the upstream connecting part, and the sensor or the injector is disposed inside this space. Therefore, the one of the sensor and the injector can be prevented from projecting forward from the exhaust passage, while the sensor or the injector is disposed between the first purifying part and the second purifying part. Thus, according to this configuration of the present disclosure, a clearance or distance between one of the sensor and the injector, and auxiliary machinery or accessory provided forward of the sensor or the injector in the front-and-rear direction, can be secured, while reducing the dimension of the area in the front-and-rear direction occupied by the turbine housing and the purifying parts.

Note that the upper part and the lower part of the front end part of the downstream connecting part indicate an upper part and a lower part of the front end part when it is divided into two in the up-and-down direction.

A lower end part of the second passage part may be inserted into the upstream connecting part. An upper wall of the second passage part may extend below a lower end part of an upper wall of the upstream connecting part.

According to this configuration, a flow of exhaust gas which passed the second passage part can be led closer to one of the sensor and the injector, and thus, the property of exhaust gas can be detected accurately, or the fluid can be injected more uniformly by the exhaust gas.

A lower surface of the upstream connecting part may curve along a curved surface bulging downwardly. One of the sensor and the injector may have a tip-end part projecting into the third passage part, below a tangent of the curved surface, the tangent passing through the lower edge of the upstream connecting part and extending in the front-and-rear direction.

According to this configuration, one of the sensor and the injector can be prevented from getting wet from condensed water which is generated from exhaust gas and flows down along the lower surface of the upstream connecting part. Therefore, the one of the sensor and the injector can be prevented from not functioning properly due to the contact with the condensed water, while attaching the sensor or the injector to the attaching part located downward of the upstream connecting part, and locating a front end of the sensor or the injector more rearward.

One of the sensor and the injector may be attached to the attaching part so as to incline forward and upward.

According to this configuration, the front end of one of the sensor and the injector can be located more rearward, compared with a case where the sensor or the injector is attached so as to extend linearly in the front-and-rear direction.

The turbine housing may be arranged so as to be adjacent to the fourth passage part in the up-and-down direction.

An upstream end part of the first passage part may linearly extend forward from the downstream end of the turbine housing. A center axis of the upstream end part of the first passage part may be extended linearly in the front-and-rear direction.

A center axis of an upstream end part of the first passage part and a center axis of a downstream end part of the turbine housing may be colinear.

A center axis of an upstream end part of the first passage part and a center axis of the fourth passage part may be substantially parallel.

DETAILED DESCRIPTION OF THE DISCLOSURE

Hereinafter, an exhaust system of an engine according to one embodiment of the present disclosure is described with reference to the accompanying drawings. The exhaust system of the engine is mounted on a vehicle. In the following description, a front-and-rear direction of the vehicle is simply referred to as a "front-and-rear direction," and in this front-and-rear direction, a traveling direction of the vehicle when traveling forward is referred to as "front" or "forward" and indicated similarly in the drawings. Moreover, herein, the vertical direction is referred to as an "up-and-down direction," and in this description and the drawings, "up" or "upward" in the vertical direction is described as "up" or "upward," and "down" or "downward" in the vertical direction as "down" or "downward."

Figure 1:
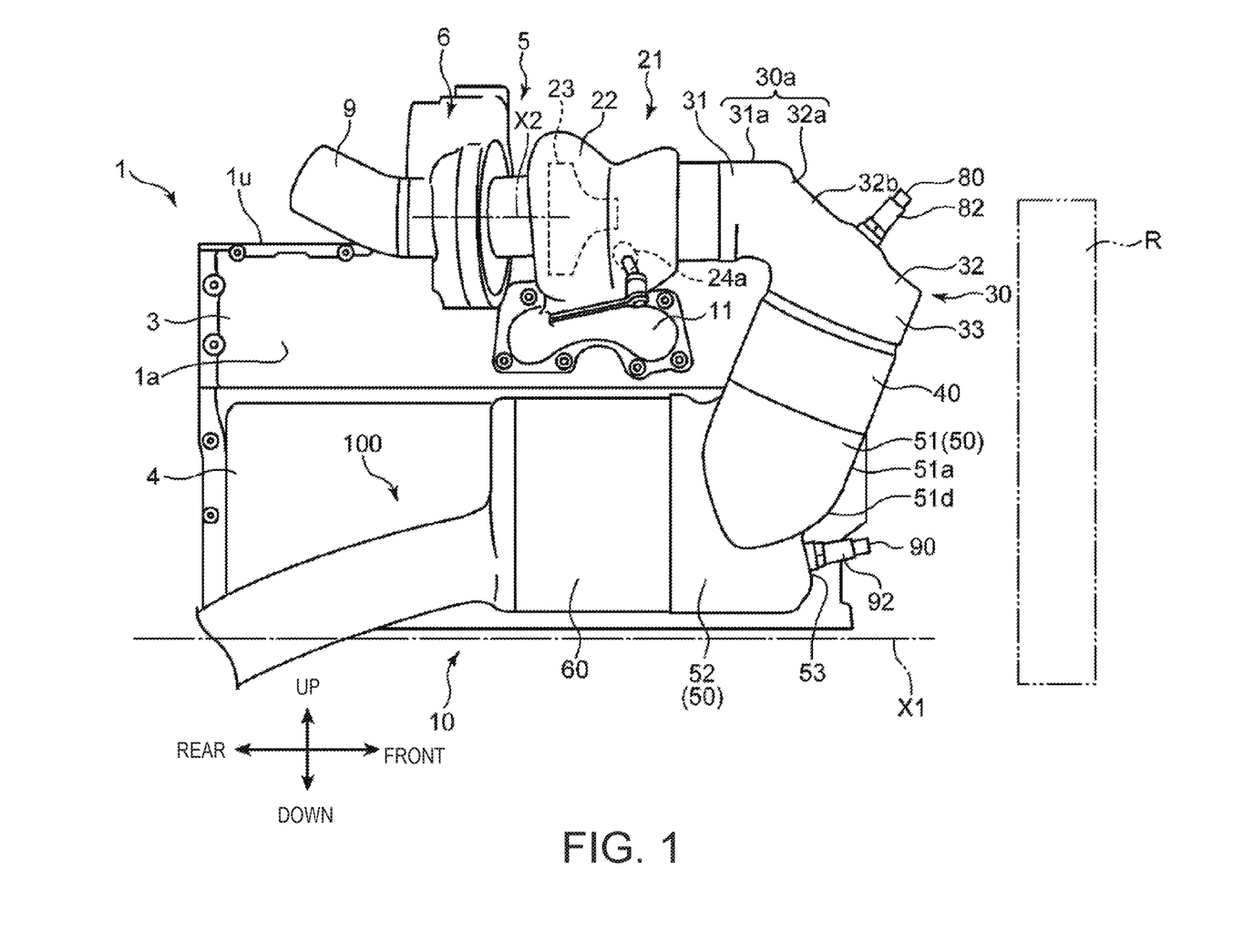
FIG. 1 is a side view schematically illustrating an exhaust system of an engine according to one embodiment of the present disclosure.
Figure 2:
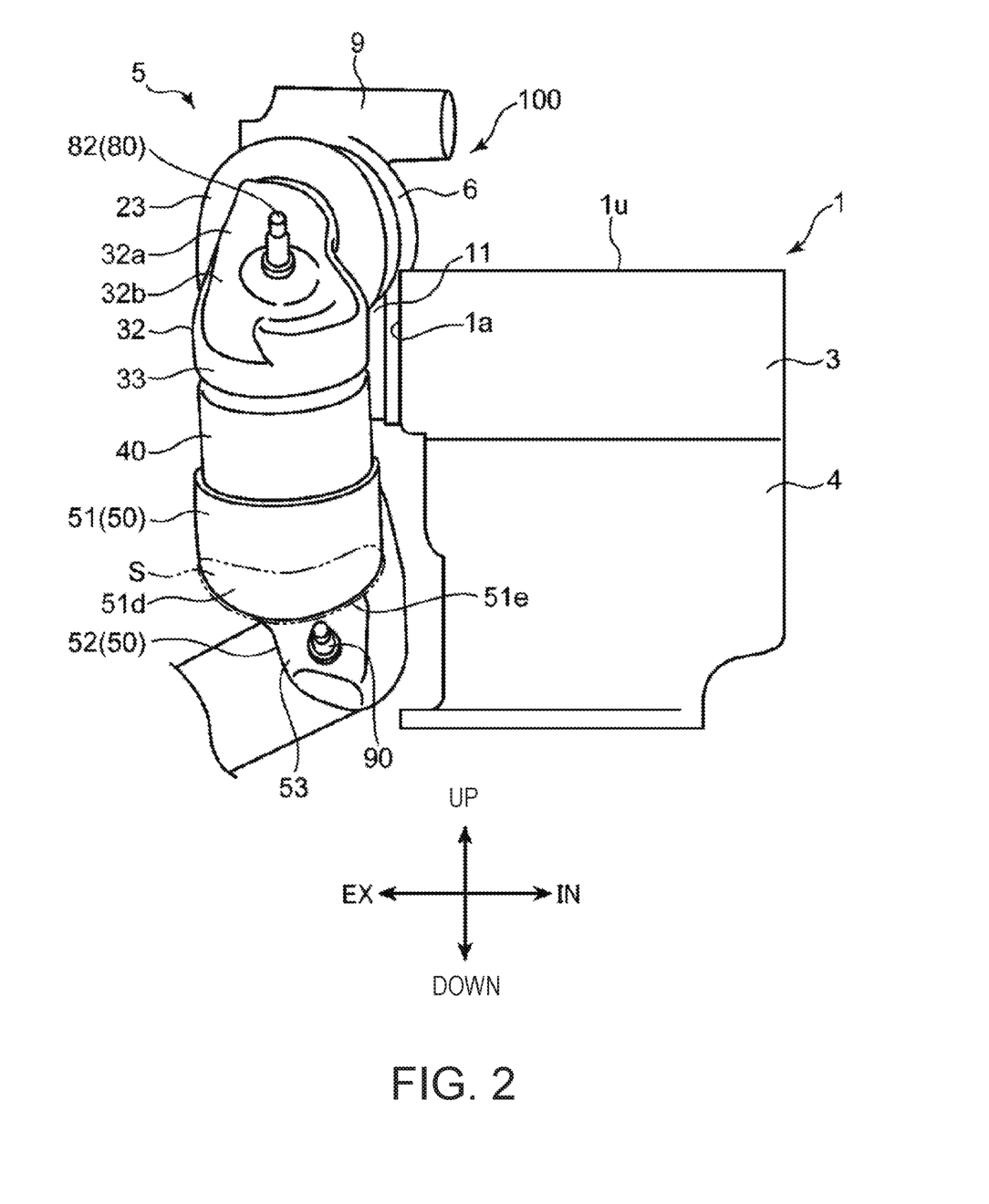
FIG. 2 is a front view schematically illustrating the exhaust system of the engine according to one embodiment of the present disclosure.
Figure 3:
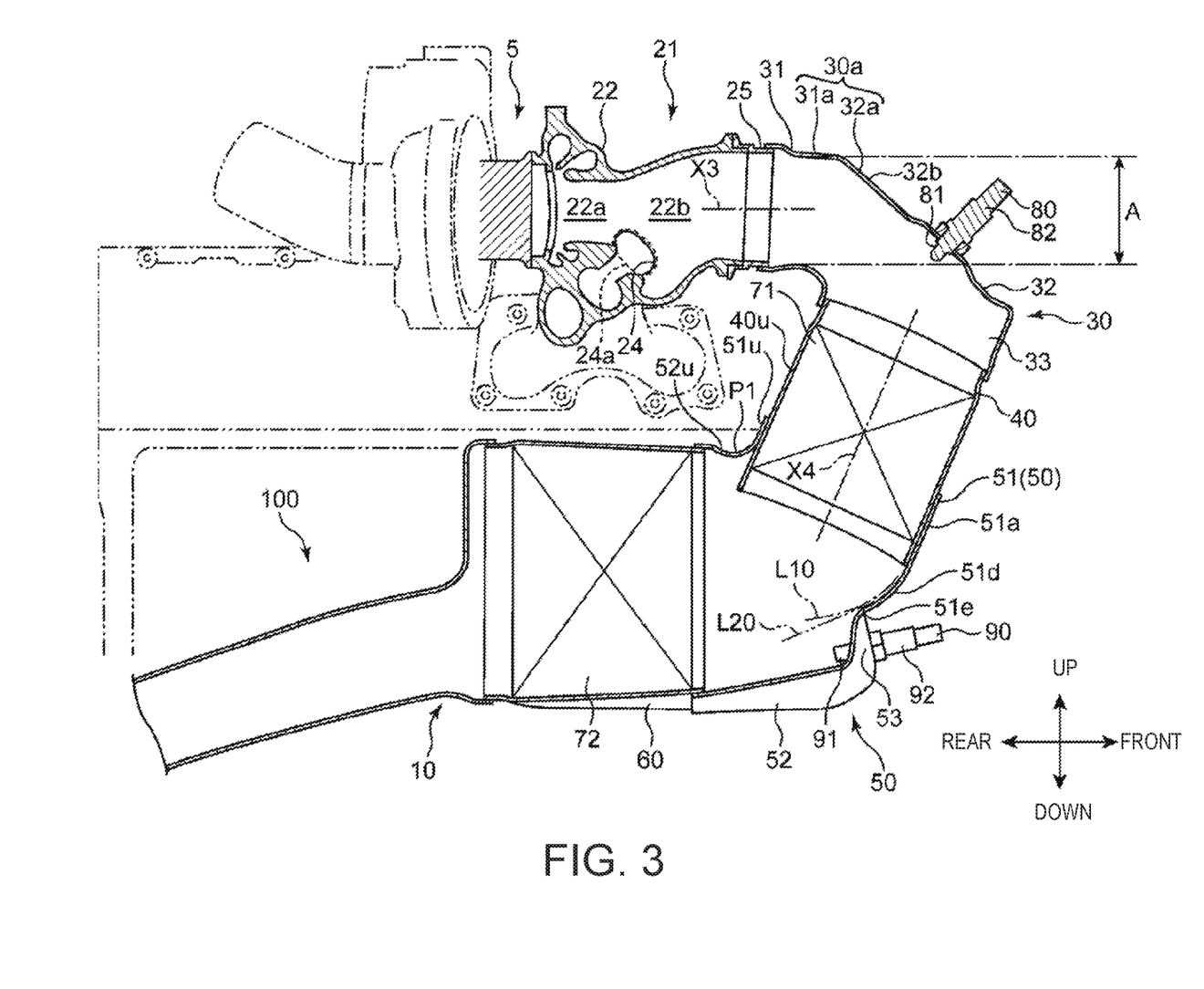
FIG. 3 is a cross-sectional view illustrating an exhaust passage, corresponding to FIG. 1.
Figure 4:
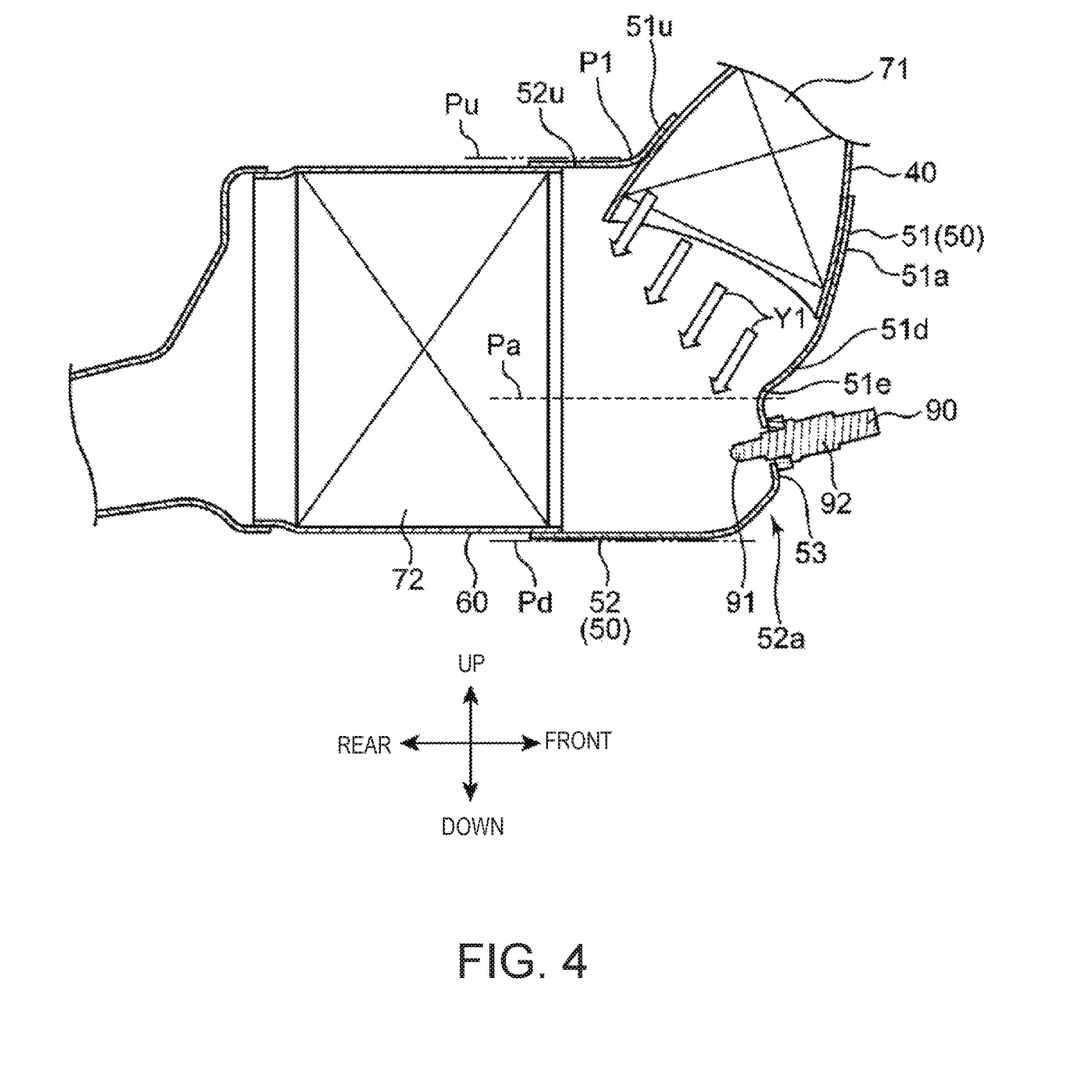
FIG. 4 is a cross-sectional view illustrating a part of the exhaust passage, cut at a center axis of a second oxygen sensor.

FIG. 1 is a side view schematically illustrating a desirable embodiment of an exhaust system 100 of the engine according to the present disclosure. FIG. 2 is a front view schematically illustrating the exhaust system 100. FIG. 3 is a cross-sectional view illustrating an exhaust passage 10, corresponding to FIG. 1. FIG. 4 is a cross-sectional view illustrating a part of the exhaust passage 10, which is cut at a plane passing through the center axis of a second oxygen sensor 90 (described later).

An engine 1 (hereinafter, referred to as an "engine body 1") illustrated in FIG. 1 is a four-cycle gasoline engine mounted on the vehicle as a power source for traveling. The engine body 1 is an in-series multiple-cylinder engine, and has a plurality of cylinders lined up along a center axis X1 of a crankshaft (not illustrated) which is an output shaft of the engine. In this embodiment, the engine body 1 is accommodated in an engine bay formed in the front side of the vehicle, in such a posture so that the center axis X1 of the crankshaft extends in the front-and-rear direction (i.e., the engine body 1 is a so-called "longitudinal engine").

The engine body 1 has a cylinder block 4 where the cylinders are formed therein, and a cylinder head 3 attached to an upper surface of the cylinder block 4. That is, in this embodiment, the engine body 1 is mounted on the vehicle in such a posture that a piston (not illustrated) fitted in each cylinder slides in the up-and-down direction and the cylinder block 4 where the cylinders are formed is located below the cylinder head 3. Note that although in the illustrated example the upper surface of the cylinder block 4 and the lower surface of the cylinder head 3 extend along a horizontal plane and the pistons slide up and down along the vertical line, the engine body 1 may be inclined to the vertical line, the upper surface and the lower surface may be inclined to the horizontal plane, and the sliding direction of the pistons may be inclined to the vertical line.

The exhaust passage 10 where exhaust gas circulates therein is connected to one side surface 1a of the engine body 1 in the width direction (a direction perpendicular to both the front-and-rear direction and the up-and-down direction), and exhaust gas discharged from the engine body 1 is discharged outside of the engine body 1 and the vehicle through this exhaust passage 10. Below, the one side surface 1a of the engine body 1 in the width direction to which the exhaust passage 10 is connected is suitably referred to as the "exhaust side surface 1a." Note that in the drawings, "EX" indicates the side in the width direction of the engine body 1 to which the exhaust passage 10 is connected, and "IN" is the opposite side and indicates the side to which an intake passage 9 for introducing intake air into the engine body 1 is connected.

The exhaust passage 10 is provided with an exhaust manifold 11, a turbine-side part 21 of a turbocharger 5, a first exhaust pipe 30, a second exhaust pipe 40, a third exhaust pipe 50, and a fourth exhaust pipe 60 in this order from upstream. Each of the exhaust pipes 30, 40, 50, and 60 is a pipe member where a passage through which exhaust gas circulates is formed therein. The exhaust passage 10 has a first purifying part 71 and a second purifying part 72 for purifying exhaust gas. The first purifying part 71 is accommodated inside the second exhaust pipe 40. The second purifying part 72 is accommodated inside the fourth exhaust pipe 60. In this embodiment, each of the first purifying part 71 and the second purifying part 72 is a three-way catalyst carried by a monolith carrier.

The exhaust manifold 11 is fixed to the exhaust side surface 1a so as to communicate with exhaust ports. In detail, the exhaust manifold 11 is coupled to a part of the exhaust side surface 1a constituted by the cylinder head 3. Moreover, the exhaust manifold 11 is provided near the center of the exhaust side surface 1a in the front-and-rear direction.

The turbocharger 5 has a turbine wheel 23 which is driven and rotated by exhaust gas, and a compressor 6 which is driven and rotated by the turbine wheel 23 (in detail, a compressor wheel which is driven and rotated by the turbine wheel 23 and a housing which accommodates the compressor wheel). The turbocharger 5 is supported by the exhaust side surface 1a in a posture where the turbine wheel 23, the compressor 6 (compressor wheel), and a rotation center axis X2 of a coupling shaft (not illustrated) which couples the turbine wheel 23 to the compressor 6 extend in the front-and-rear direction, and the turbine wheel 23 is located forward of the compressor 6.

The turbocharger 5 is further provided with a turbine housing 22 which accommodates the turbine wheel 23 and where a passage through which exhaust gas passes is formed therein. The turbine housing 22 has a wheel accommodating part 22a having a scroll part and surrounding the turbine wheel 23, and a discharge passage part 22b which extends forward from the wheel accommodating part 22a and into which exhaust steam after rotating the turbine wheel 23 is introduced. Note that in the example of FIG. 1, the turbocharger 5 is of a twin scroll type, and two scroll parts are formed in the turbine housing 22. The turbine housing 22 is connected to a downstream end of the exhaust manifold 11, and exhaust gas which passed through the exhaust manifold 11 is introduced into the turbine housing 22. The turbine housing 22 is provided with a bypass passage 24 which bypasses the turbine wheel 23 (wheel accommodating part 22a) and introduces exhaust gas into the discharge passage part 22b. The bypass passage 24 is opened and closed by a waste gate valve 24a according to an operating state, etc. of the engine.

The turbocharger 5 is disposed so that a part thereof is located above an upper surface 1u of the engine body 1 (i.e., the upper surface of the cylinder head 3). In the illustrated example, the turbocharger 5 is disposed so that the rotation center axis X2 of the turbocharger 5 is located at almost the same height as the upper surface 1u of the engine body 1, the upper part of the turbocharger 5 is located above the upper surface 1u of the engine body 1, and the lower part of the turbocharger 5 is located below the upper surface 1u of the engine body 1.

<First Exhaust Pipe 30>

The first exhaust pipe 30 is connected to a downstream end 25 of the turbine housing 22 (discharge passage part 22b), and extends forward from the downstream end 25 of the turbine housing 22. Exhaust gas is introduced into the first exhaust pipe 30 from the turbine housing 22.

An upstream end part 31 of the first exhaust pipe 30 extends linearly forward from the downstream end 25 of the turbine housing 22, and a center axis X3 of the upstream end part 31 extends linearly in the front-and-rear direction. In this embodiment, the cross section of the upstream end part 31 presents a circular shape close to a true circle. Moreover, the center axis X3 of the upstream end part 31 is in agreement (i.e., coaxial) with the center axis of a downstream end part of the turbine housing 22 (a part between the downstream end 25 and a location slightly rearward of the downstream end 25).

The first exhaust pipe 30 has such a shape that it inclines forward and downward from the upstream end part 31 and then bends rearward and downward. That is, a part of the first exhaust pipe 30 downstream of the upstream end part 31 is comprised of an intermediate part 32 which inclines forward and downward from the upstream end part 31, and a downstream end part 33 which inclines rearward and downward from a downstream end of the intermediate part 32. The intermediate part 32 is formed so that a length of an upper plane in the flow direction is longer than a lower plane and the downstream end is substantially along a horizontal plane. The downstream end part 33 which extends to the downstream from the intermediate part 32 is constituted so that a length of a forward plane in the flow direction is longer than the rearward plane. Thus, a downstream end of the first exhaust pipe 30 and the downstream end part 33 opens rearward and downward.

With the above structure, an upper surface 30a of the first exhaust pipe 30 has such a shape that it is located lower as it goes forward. In detail, the upper surface 30a of the first exhaust pipe 30 is comprised of an upper surface 31a of the upstream end part 31 which extends linearly in the front-and-rear direction, and an upper surface (slope 32a) of the intermediate part 32 which inclines forward and downward from the upper surface 31a of the upstream end part 31. That is, the upper surface 30a extends linearly forward from the upstream end (rear end) of the first exhaust pipe 30 and then inclines downwardly.

The center part of the slope 32a is provided with a flat-surface part 32b. The flat-surface part 32b is formed in a range of the intermediate part 32 in the flow direction of exhaust gas from a location slightly downstream of the upstream end of the intermediate part 32 to a location slightly upstream of the downstream end of the intermediate part 32. Moreover, the flat-surface part 32b is formed in a range of the intermediate part 32 other than both outer parts of the slope 32a in the engine width direction.

A first oxygen sensor 80 which detects an oxygen concentration in exhaust gas is attached to the center part of the flat-surface part 32b. The first oxygen sensor 80 has a substantially pillar outer shape which extends in a given direction, and is provided with a tip-end part 81 which introduces exhaust gas therein and leads outside the exhaust gas.

The first oxygen sensor 80 is attached to the flat-surface part 32b so that the tip-end part 81 projects inside the intermediate part 32 and a base-end part 82 of the first oxygen sensor 80 extends outside from the intermediate part 32. In this embodiment, the first oxygen sensor 80 is attached to the flat-surface part 32b in such a posture that it inclines forward and upward from the flat-surface part 32b. Moreover, the first oxygen sensor 80 is attached to such a location that the tip-end part 81 exists within an area A surrounded by an inner circumferential surface of the upstream end part 31, when it is seen in a direction along the center axis X3 of the upstream end part 31 of the first exhaust pipe 30. In this embodiment, the first oxygen sensor 80 is attached to a location below the center of the flat-surface part 32b in the up-and-down direction so that the tip-end part 81 is located in a part of the area A below the center in the up-and-down direction. In the illustrated example, the tip-end part 81 of the first oxygen sensor 80 is located near a lower end of the area A. In this embodiment, the part to which the first oxygen sensor 80 is attached bulges slightly upward to increase the rigidity.

As described above, in this embodiment, the upper part of the turbocharger 5 is disposed at the location above the upper surface 1*u* of the engine body 1, and in connection with this, a part of the first exhaust pipe 30 extending from the turbine housing 22 is disposed at the location above the upper surface 1*u* of the engine body 1. In the illustrated example, the upstream end part 31 of the first exhaust pipe 30 and the part of the intermediate part 32 near the upstream end are disposed at the locations above the upper surface 1*u* of the engine body 1.

<Second Exhaust Pipe 40>

The second exhaust pipe 40 is connected to the downstream end of the first exhaust pipe 30, and exhaust gas is introduced into the second exhaust pipe 40 from the first exhaust pipe 30.

The second exhaust pipe 40 extends along a line which extends the downstream end part 33 of the first exhaust pipe 30 downwardly, and extends rearward and downward from the downstream end of the first exhaust pipe 30 (downstream end part 33). A center axis X4 of the second exhaust pipe 40 extends along a line which inclines rearward and downward, and it inclines so that an upper end is located forward of a lower end. An outer diameter of the first purifying part 71 and an inner diameter of the second exhaust pipe 40 are substantially the same so that the first purifying part 71 is accommodated inside the second exhaust pipe 40 with substantially no clearance therebetween in the radial direction. Moreover, the dimension of the first purifying part 71 in the up-and-down direction (a dimension in the flow direction) is slightly smaller than the dimension of the second exhaust pipe 40 in the up-and-down direction (a dimension in the flow direction) so that the first purifying part 71 occupies substantially the entire internal space of the second exhaust pipe 40.

<Third Exhaust Pipe 50>

The third exhaust pipe 50 is connected to a downstream end of the second exhaust pipe 40, and exhaust gas is introduced into the third exhaust pipe 50 from the second exhaust pipe 40. The third exhaust pipe 50 extends rearward from the downstream end of the second exhaust pipe 40. The third exhaust pipe 50 is comprised of a first connecting part 51 which constitutes an upstream part and into which the second exhaust pipe 40 is inserted, and a second connecting part 52 downstream of the first connecting part 51. A lower end part of the second exhaust pipe 40 is connected to the first connecting part 51 while being inserted into the first connecting part 51 which constitutes an upstream end part of the third exhaust pipe 50.

The first connecting part 51 inclines rearward and downward so that its inner circumferential surface extends along an outer circumferential surface of the second exhaust pipe 40. A front wall 51*a* (a part which constitutes a front surface) of the first connecting part 51 extends to a location below the downstream end of the second exhaust pipe 40. A part 51*d* (a part formed as an area S of FIG. 2) of the front wall 51*a* of the first connecting part 51 below the downstream end of the second exhaust pipe 40 constitutes a lower surface of the first connecting part 51. This part 51*d* extends along a curved surface L10 which bulges downwardly, and therefore it also curves so as to bulge downwardly. The curved part 51*d* is formed entirely in the front wall 51*a* of the first connecting part 51 in the engine width direction. That is, this curved part is formed substantially entirely in the area from one end of the first connecting part 51 to the other end in the engine width direction, which is located at the front side.

The second connecting part 52 extends rearward from a downstream end of the first connecting part 51. The first connecting part 51 extends forward and upward from an upper part of a front end part 52*a* of the second connecting part 52, and the third exhaust pipe 50 is provided with a standing wall part 53 which extends downwardly from a lower edge 51*e* of the first connecting part 51 and constitutes a lower part of the front end part 52*a* of the second connecting part 52 and a front end surface of the second connecting part 52. The standing wall part 53 is provided substantially entirely from one end of the second connecting part 52 to the other end in the engine width direction. That is, when the front end part 52*a* of the second connecting part 52 is divided into two in the up-and-down direction, the first connecting part 51 extends forward and upward from the upper part, and the lower part is provided with the standing wall part 53 which extends in the up-and-down direction and the engine width direction. As illustrated in FIG. 4, in this embodiment, a height Pa of a lower end (51*e* in FIG. 4) of the first connecting part 51 is below the center of a height Pu at an upper end of the front end part 52*a* of the second connecting part 52 and a height Pd at a lower end of the front end part 52*a* of the second connecting part 52, and the standing wall part 53 is provided in an area from the height Pa to the lower end Pd. For example, a distance between the height Pu at the upper end of the front end part 52*a* of the second connecting part 52 and the height Pa at the lower end (51*e* in FIG. 4) of the first connecting part 51 is 60% of a distance between the height Pu at the upper end of the front end part 52*a* of the second connecting part 52 and the height Pd at the lower end. Note that the concrete distance rate is not limited to the above example, and, for example, the height at the lower end of the first connecting part 51 may be at the center (50% location) between the height Pu at the upper end of the front end part 52*a* of the second connecting part 52 and the height Pd at the lower end. Note that FIG. 4 is a schematic cross-sectional view cut at a plane passing through the center axis of the second oxygen sensor 90.

Figure 5:
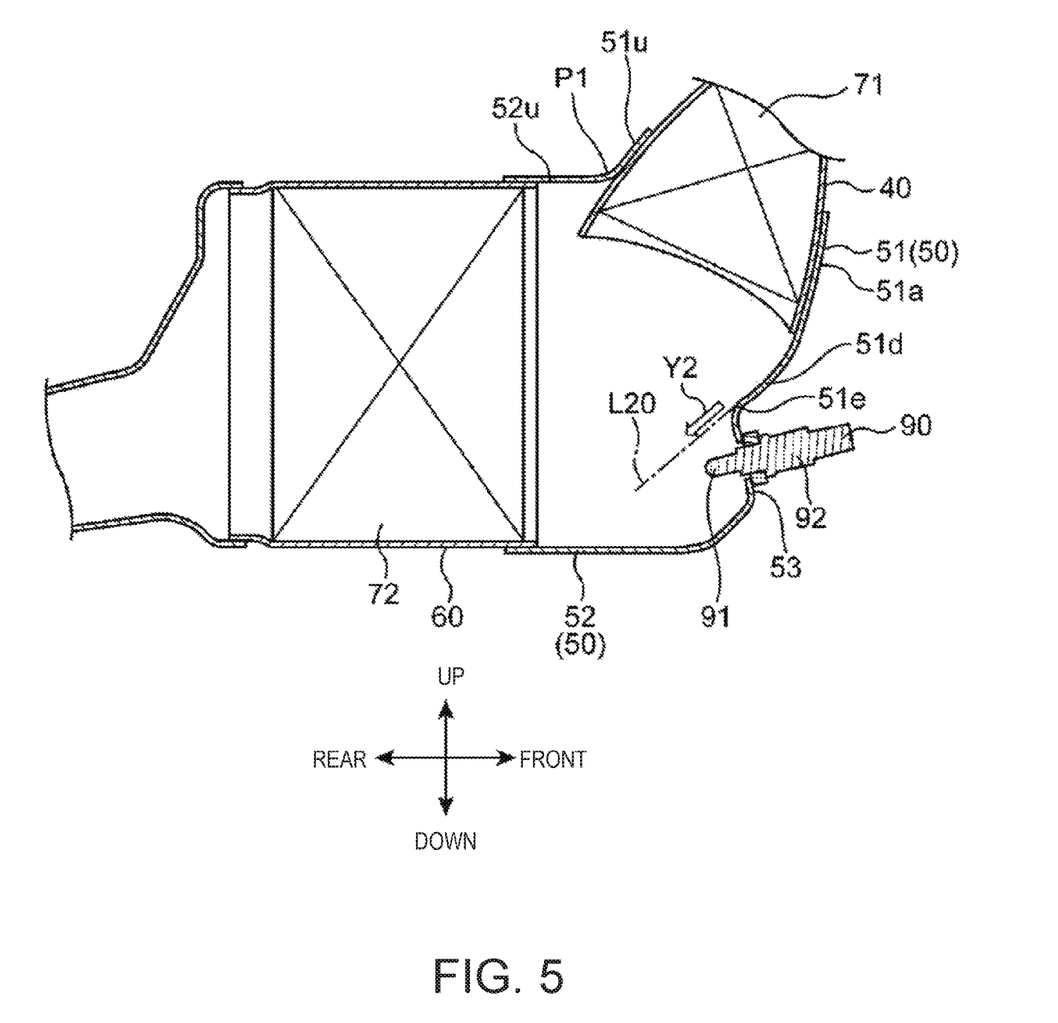
FIG. 5 is a view illustrating a flow of exhaust gas in a third passage part.

A sensor which is the second oxygen sensor 90 for detecting the oxygen concentration in exhaust gas and has a similar shape and structure to the first oxygen sensor 80 is attached to a center part of the standing wall part 53. The second oxygen sensor 90 is attached to the standing wall part 53 so that its tip-end part 91 is inserted into the second connecting part 52 and its base-end part 92 extends forward from the standing wall part 53. The second oxygen sensor 90 is attached to the standing wall part 53 in such a posture that it inclines slightly forward and upward from the standing wall part 53. In this embodiment, the standing wall part 53 inclines slightly upward and rearward, and the second oxygen sensor 90 is attached so as to be perpendicular to the standing wall part 53. Moreover, the second oxygen sensor 90 is attached so that its tip-end part 91 which projects inside the second connecting part 52 is located below a tangent L20 of the curved surface L10 which extends in the front-and-rear direction and passes through the lower edge 51*e* of the first connecting part 51. In detail, the second oxygen sensor 90 is disposed so that the tip-end part 91 becomes lower than the tangent L20 of the curved surface L10 at any point on the lower edge 51*e* of the first connecting part 51, in the vertical cross-section perpendicular to the lower edge 51*e*. Moreover, as illustrated in FIG. 5, also in the vertical cross-section passing through the center axis of the second oxygen sensor 90, the tip-end part 91 of the second oxygen sensor 90 is disposed at a location lower than the tangent L20 of the curved surface L10 (a tangent passing through the lower edge 51e).

As illustrated in FIG. 3, an upper wall 40u (a part which constitutes the upper surface) of the second exhaust pipe 40 extends below a lower end part of an upper wall 51u (a part which constitutes the upper surface) of the first connecting part 51. That is, the upper wall 40u of the second exhaust pipe 40 extends to a location lower than and downstream of a boundary part P1 between the upper wall 51u of the first connecting part 51 and an upper wall 52u (a part which constitutes the upper surface) of the second connecting part 52.

<Fourth Exhaust Pipe 60>

The fourth exhaust pipe 60 is connected to a downstream end of the third exhaust pipe 50 (the second connecting part 52), and exhaust gas is introduced into the fourth exhaust pipe 60 from the third exhaust pipe 50. The fourth exhaust pipe 60 is connected to the third exhaust pipe 50 so that its upstream end is inserted into the downstream end of the third exhaust pipe 50.

The fourth exhaust pipe 60 extends along a line which extends the downstream end of the third exhaust pipe 50 rearwardly, and extends rearwardly from the downstream end of the third exhaust pipe 50. An outer diameter of the second purifying part 72 and an inner diameter of the fourth exhaust pipe 60 are substantially the same so that the second purifying part 72 is accommodated in the fourth exhaust pipe 60 with substantially no clearance therebetween in the radial direction. Moreover, a dimension of the second purifying part 72 in the front-and-rear direction (a dimension in the flow direction) is slightly smaller than a dimension of the fourth exhaust pipe 60 in the front-and-rear direction (a dimension in the flow direction) so that the second purifying part 72 occupies substantially the entire internal space of the fourth exhaust pipe 60.

The fourth exhaust pipe 60 and the third exhaust pipe 50 which extends forward from the fourth exhaust pipe 60 are disposed below the turbine housing 22. In detail, a downstream part of the third exhaust pipe 50 and substantially the entire part of the fourth exhaust pipe 60 overlap with the turbine housing 22 in the plan view.

Here, the first exhaust pipe 30 is an example of a "first passage part" in the present disclosure. Moreover, the second exhaust pipe 40 is an example of a "second passage part" in the present disclosure. Moreover, the third exhaust pipe 50 is an example of a "third passage part" in the present disclosure. The first connecting part 51 is an example of an "upstream connecting part" in the present disclosure. The second connecting part 52 is an example of a "downstream connecting part" in the present disclosure. Moreover, the fourth exhaust pipe 60 is an example of a "fourth passage part" in the present disclosure. Moreover, the standing wall part 53 is an example of an "attaching part" in the present disclosure. Moreover, the second oxygen sensor 90 is an example of a "sensor" in the present disclosure.

(Operation)

As described above, in this embodiment, the first exhaust pipe 30 extends forward from the turbine housing 22, and the fourth exhaust pipe 60 which accommodates the second purifying part 72 therein is disposed so as to extend in the front-and-rear direction below the turbine housing 22. The second exhaust pipe 40 which accommodates the first purifying part 71 therein extends upwardly from the front end of the third exhaust pipe 50 and is connected to the first exhaust pipe 30. According to this structure, in this embodiment, the exhaust passage 10 from the turbine housing 22 to the fourth exhaust pipe 60 can be shortened in the front-and-rear direction, compared with a case where the second purifying part 72 and the first exhaust pipe 30 are lined up in the front-and-rear direction.

In addition, in this embodiment, the second exhaust pipe 40 and the first connecting part 51 connected to the second exhaust pipe 40 are disposed so as to incline forward and upward, the standing wall part 53 which extends downwardly from the lower edge 51e of the first connecting part 51 is provided, and the second oxygen sensor 90 is attached to the standing wall part 53. That is, a space for attaching the second oxygen sensor 90 is secured below the second exhaust pipe 40 and the first connecting part 51, and the second oxygen sensor 90 is disposed inside this space. Therefore, the front end of the second oxygen sensor 90 can be located more rearward, while the second oxygen sensor 90 is disposed between the first purifying part 71 and the second purifying part 72. Therefore, a clearance or distance between the second oxygen sensor 90 and auxiliary machinery or accessory, such as a radiator R (see FIG. 1) provided forward of the second oxygen sensor 90 in the front-and-rear direction can be secured so that an interference of the radiator R with the second oxygen sensor 90, for example, in a front collision of the vehicle can be certainly reduced. Moreover, it is possible to easily install and remove the second oxygen sensor 90 by utilizing the space between the second oxygen sensor 90 and the auxiliary machinery provided forward of the second oxygen sensor 90.

Particularly, in this embodiment, the second oxygen sensor 90 is attached to the standing wall part 53 in such a posture that it inclines forward and upward. Therefore, compared with a case where the second oxygen sensor 90 is attached so as to extend linearly forward, the front end of the second oxygen sensor 90 can be located more rearward.

Moreover, in this embodiment, the lower end of the second exhaust pipe 40 is inserted into the first connecting part 51, and the upper wall 40u of the second exhaust pipe 40 extends below a lower end part of the upper wall 51u of the first connecting part 51 (a boundary part P1 between the upper wall 51u of the first connecting part 51 and the upper wall 52u of the second connecting part 52). Thus, as illustrated by arrows Y1 in FIG. 4, the flow of exhaust gas introduced into the third exhaust pipe 50 from the second exhaust pipe 40 can be maintained as the rearward and downward flow along the center axis X4 of the second exhaust pipe 40, and therefore, the exhaust gas can be led downwardly. Therefore, the contact of the tip-end part 91 of the second oxygen sensor 90 disposed at the lower part of the second connecting part 52 with exhaust gas can be facilitated, and thus, the detection accuracy of the second oxygen sensor 90 can be improved.

Moreover, in this embodiment, the part 51d of the front wall 51a of the first connecting part 51 below the downstream end of the second exhaust pipe 40 constitutes the lower surface of the first connecting part 51 and curves along the curved surface L10 which bulges downwardly. The tip-end part 91 of the second oxygen sensor 90 is disposed below the tangent L20 of the curved surface L10 passing through the lower edge 51e of the first connecting part 51. Therefore, even if condensed water generated from exhaust gas flows down to the second connecting part 52 side along the lower surface 51d of the first connecting part 51, the condensed water can be dispersed rearward, as illustrated by an arrow Y2 in FIG. 5. Therefore, the tip-end part 91 of the second oxygen sensor 90 disposed below the first connecting part 51 can be prevented from getting wet from the condensed water, and thus, the reliability of the second oxygen sensor 90 can be increased. Note that FIG. 5 is a schematic cross-sectional view cut at a plane passing through the center axis of the second oxygen sensor 90.

(Modifications)

Although in the above embodiment the sensor attached to the standing wall part 53 is the second oxygen sensor 90 which detects the oxygen concentration in exhaust gas, the parameter to be detected is not limited to the oxygen concentration, as long as the sensor attached to the standing wall part 53 is capable of detecting a property of exhaust gas. For example, a urea injector which injects urea into exhaust gas may be attached. In this case, the urea injector is used as the second oxygen sensor 90 in FIG. 1. When the urea injector is attached to the standing wall part 53 in the above embodiment instead of the second oxygen sensor, it is possible to inject urea into a larger amount of exhaust gas to mix the urea more uniformly with the exhaust gas by directing the flow of exhaust gas introduced into the third exhaust pipe 50 from the second exhaust pipe 40 to downward as described above.

The first purifying part 71 and the second purifying part 72 are not limited to the three-way catalysts, as long as they are capable of purifying exhaust gas. Moreover, the first purifying part 71 and the second purifying part 72 may be a filter without any catalyst.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

5 Turbocharger
10 Exhaust Passage
21 Turbine
22 Turbine Housing
23 Turbine Wheel
30 First Exhaust Pipe (First Passage Part)
40 Second Exhaust Pipe (Second Passage Part)
50 Third Exhaust Pipe (Third Passage Part)
51 First Connecting Part (Upstream Connecting Part)
52 Second Connecting Part (Downstream Connecting Part)
53 Standing Wall Part (Attaching Part)
60 Fourth Exhaust Pipe (Fourth Passage Part)
71 First Purifying Part
72 Second Purifying Part
90 Second Oxygen Sensor

What is claimed is:

1. An exhaust system provided to an engine having an output shaft extending in a front-and-rear direction of a vehicle, comprising:
    an exhaust passage through which exhaust gas discharged from the engine circulates;
    a turbocharger having a turbine housing, the turbine housing being formed therein with a passage through which exhaust gas passes and configured to accommodate a turbine wheel being driven by exhaust gas; and
    a first purifying part and a second purifying part configured to purify exhaust gas,
    wherein the exhaust passage includes:
        a first passage part connected to a downstream end of the turbine housing;
        a second passage part having the first purifying part therein and connected to a downstream end of the first passage part;
        a third passage part connected to a downstream end of the second passage part; and
        a fourth passage part having the second purifying part therein and connected to a downstream end of the third passage part,
    wherein the first passage part extends forward from the turbine housing,
    wherein the fourth passage part extends in the front-and-rear direction below the turbine housing,
    wherein the second passage part is disposed at a location between the first passage part and the third passage part in an up-and-down direction so that the second passage part extends in the up-and-down direction and a center axis thereof inclines forward and upward,
    wherein the third passage part has a downstream connecting part extending forward from a front end part of the fourth passage part, and an upstream connecting part extending forward and upward from an upper part of a front end part of the downstream connecting part,
    wherein the downstream connecting part has an attaching part provided to a lower part of the front end part thereof and extending downwardly from a lower edge of the upstream connecting part,
    wherein one of a sensor configured to detect a property of exhaust gas and an injector configured to inject fluid into exhaust gas is attached to the attaching part,
    wherein each of the first purifying part and the second purifying part is at least one of a catalyst or a filter;
    wherein a lower surface of the upstream connecting part bulges downwardly and is provided with the lower edge curving toward an interior of the third passage part,
    wherein the one of the sensor configured to detect a property of exhaust gas and the injector configured to inject fluid into exhaust gas is provided on a lower side of the lower edge,
    wherein the lower surface of the upstream connecting part curves along a curved surface bulging downwardly, and
    wherein one of the sensor and the injector has a tip-end part projecting into the third passage part, below a tangent of the curved surface, the tangent passing through the lower edge of the upstream connecting part and extending in the front-and-rear direction, thereby preventing the tip-end part from becoming wet from condensed water generated from exhaust gas.

2. The exhaust system of claim 1,
    wherein a lower end part of the second passage part is inserted into the upstream connecting part, and
    wherein an upper wall of the second passage part extends below a lower end part of an upper wall of the upstream connecting part.

3. The exhaust system of claim 2,
    wherein the lower surface of the upstream connecting part curves along a curved surface bulging downwardly, and
    wherein one of the sensor and the injector has a tip-end part projecting into the third passage part, below a tangent of the curved surface, the tangent passing through the lower edge of the upstream connecting part and extending in the front-and-rear direction.

4. The exhaust system of claim 3, wherein one of the sensor and the injector is attached to the attaching part so as to incline forward and upward.

5. The exhaust system of claim 1, wherein one of the sensor and the injector is attached to the attaching part so as to incline forward and upward.

6. The exhaust system of claim 2, wherein one of the sensor and the injector is attached to the attaching part so as to incline forward and upward.

7. The exhaust system of claim 1, wherein one of the sensor and the injector is attached to the attaching part so as to incline forward and upward.

8. The exhaust system of claim 1, wherein the turbine housing is arranged so as to be adjacent to the fourth passage part in the up-and-down direction.

9. The exhaust system of claim 1,
wherein an upstream end part of the first passage part linearly extends forward from the downstream end of the turbine housing, and
wherein a center axis of the upstream end part of the first passage part is extended linearly in the front-and-rear direction.

10. The exhaust system of claim 1, wherein a center axis of an upstream end part of the first passage part and a center axis of a downstream end part of the turbine housing is colinear.

11. The exhaust system of claim 1, wherein a center axis of an upstream end part of the first passage part and a center axis of the fourth passage part are substantially parallel.

12. The exhaust system of claim 9, wherein the center axis of the upstream end part of the first passage part and a center axis of a downstream end part of the turbine housing is colinear.

13. The exhaust system of claim 10, wherein the center axis of the upstream end part of the first passage part and a center axis of the fourth passage part are substantially parallel.

14. The exhaust system of claim 11, wherein the center axis of the upstream end part of the first passage part and a center axis of the fourth passage part are substantially parallel.

15. The exhaust system of claim 1,
wherein the attaching part comprises the lower part of the front end part of the downstream connecting part and a front end surface of the downstream connecting part, and
wherein the one of the sensor configured to detect a property of exhaust gas and the injector configured to inject fluid into exhaust gas is provided on a center part of the attaching part.

* * * * *